US008898394B2

(12) United States Patent
Kondo et al.

(10) Patent No.: US 8,898,394 B2
(45) Date of Patent: Nov. 25, 2014

(54) DATA MIGRATION METHOD

(75) Inventors: Norio Kondo, Kawasaki (JP); Satoshi Konno, Kawasaki (JP); Ken-ichiroh Tango, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/851,907

(22) Filed: Aug. 6, 2010

(65) Prior Publication Data
US 2011/0040943 A1 Feb. 17, 2011

(30) Foreign Application Priority Data

Aug. 12, 2009 (JP) ................................. 2009-187401

(51) Int. Cl.
*G06F 12/00* (2006.01)
*G06F 3/06* (2006.01)

(52) U.S. Cl.
CPC ............ *G06F 3/0619* (2013.01); *G06F 3/0649* (2013.01); *G06F 3/0685* (2013.01); *G06F 3/0647* (2013.01); *G06F 3/0607* (2013.01)
USPC ...... 711/143; 711/E12.103; 714/48; 714/719; 714/732; 714/799; 714/819; 714/E11.04

(58) Field of Classification Search
None
See application file for complete search history.

(56) References Cited

U.S. PATENT DOCUMENTS

| 5,649,089 | A | * | 7/1997 | Kilner ............................ 714/6.3 |
| 5,742,792 | A | * | 4/1998 | Yanai et al. .................... 711/162 |
| 5,878,050 | A | * | 3/1999 | Brahme et al. ................. 714/719 |
| 6,272,649 | B1 | * | 8/2001 | Hayward et al. ................ 714/6.1 |
| 6,446,235 | B1 | * | 9/2002 | Drottar et al. .................. 714/781 |
| 6,490,610 | B1 | * | 12/2002 | Rizvi et al. .................... 718/101 |
| 6,687,791 | B2 | * | 2/2004 | Morrison ....................... 711/130 |
| 6,694,451 | B2 | * | 2/2004 | Atkinson ........................ 714/15 |
| 6,728,747 | B1 | * | 4/2004 | Jenkins et al. ................. 718/101 |
| 6,948,031 | B2 | * | 9/2005 | Chilton .......................... 711/113 |
| 6,964,008 | B1 | * | 11/2005 | Van Meter, III .............. 714/807 |

(Continued)

FOREIGN PATENT DOCUMENTS

| JP | 6-103127 A | 4/1994 |
| JP | 2002-23966 A | 1/2002 |

(Continued)

OTHER PUBLICATIONS

Yong Yu, (What is Checksum and How to Calculate and Use Checksum Values to Verify Data and File Integrity), Jun. 8, 2008, pp. 1-2, http://web.archive.org/web/20080608230803/http://www.geeksengine.com/article/checksum.html.*

(Continued)

*Primary Examiner* — Edward Dudek, Jr.
*Assistant Examiner* — Christopher Birkhimer
(74) *Attorney, Agent, or Firm* — Fujitsu Patent Center

(57) ABSTRACT

A storage apparatus for controlling a storage unit includes a cache memory for temporarily storing data to be stored in the storage unit, and a processor for executing a process including receiving unit data which is divided from data to be migrated, calculating first checksum data from the received unit data, storing the unit data and the first checksum data to the cache memory, reading out the stored unit data and the first checksum data from the cache memory, calculating second checksum data from the read out unit data, storing the unit data to the storage unit, and determining whether data migration has been performed properly by comparing the first checksum data to the second checksum data.

23 Claims, 9 Drawing Sheets

(56) References Cited

U.S. PATENT DOCUMENTS

| | | | |
|---|---|---|---|
| 6,988,235 B2* | 1/2006 | Brown | 714/758 |
| 7,003,702 B2* | 2/2006 | Budd et al. | 714/52 |
| 7,017,107 B2* | 3/2006 | Talagala et al. | 714/819 |
| 7,058,980 B1* | 6/2006 | Link et al. | 726/34 |
| 7,062,704 B2* | 6/2006 | Talagala et al. | 714/819 |
| 7,107,421 B2 | 9/2006 | Kaneda et al. | |
| 7,124,258 B2 | 10/2006 | Nakayama et al. | |
| 7,200,780 B2 | 4/2007 | Kushida | |
| 7,237,079 B2 | 6/2007 | Kaneda et al. | |
| 7,307,902 B2* | 12/2007 | Thayer | 365/200 |
| 7,383,490 B2* | 6/2008 | Almasi et al. | 714/800 |
| 7,433,919 B2 | 10/2008 | Terao | |
| 7,451,285 B2 | 11/2008 | Maki et al. | |
| 7,469,325 B2 | 12/2008 | Shibayama et al. | |
| 7,721,056 B2 | 5/2010 | Wake | |
| 7,752,409 B2 | 7/2010 | Morishita et al. | |
| 7,779,207 B2* | 8/2010 | Pudipeddi | 711/135 |
| 7,941,409 B2 | 5/2011 | Mimatsu | |
| 2001/0049808 A1* | 12/2001 | Brown | 714/758 |
| 2002/0073358 A1* | 6/2002 | Atkinson | 714/21 |
| 2003/0005228 A1* | 1/2003 | Wong et al. | 711/121 |
| 2003/0177379 A1 | 9/2003 | Hori et al. | |
| 2003/0177435 A1* | 9/2003 | Budd et al. | 714/776 |
| 2005/0256972 A1 | 11/2005 | Cochran et al. | |
| 2005/0257014 A1 | 11/2005 | Maki et al. | |
| 2006/0015697 A1 | 1/2006 | Morishita et al. | |
| 2006/0059400 A1* | 3/2006 | Clark et al. | 714/752 |
| 2006/0069865 A1 | 3/2006 | Kawamura et al. | |
| 2006/0218203 A1 | 9/2006 | Yamato et al. | |
| 2006/0248370 A1* | 11/2006 | Almasi et al. | 714/4 |
| 2006/0248391 A1* | 11/2006 | Glover et al. | 714/30 |
| 2007/0255950 A1 | 11/2007 | Asanuma et al. | |
| 2008/0307271 A1 | 12/2008 | Nakajima et al. | |

FOREIGN PATENT DOCUMENTS

| | | |
|---|---|---|
| JP | 2003-271457 A | 9/2003 |
| JP | 2004-18588 A | 1/2004 |
| JP | 2004-151945 A | 5/2004 |
| JP | 2004-246736 A | 9/2004 |
| JP | 2005-25683 A | 1/2005 |
| JP | 2005-63547 A | 3/2005 |
| JP | 2005-242696 A | 9/2005 |
| JP | 2005-242740 A | 9/2005 |
| JP | 2005-327283 A | 11/2005 |
| JP | 2005-353044 A | 12/2005 |
| JP | 2006-31367 A | 2/2006 |
| JP | 2006-099495 A | 4/2006 |
| JP | 2006-235698 A | 9/2006 |
| JP | 2006-268740 A | 10/2006 |
| JP | 2007-140887 A | 6/2007 |
| JP | 2007-286709 A | 11/2007 |
| JP | 2007-299114 A | 11/2007 |
| JP | 2007-310448 A | 11/2007 |
| JP | 2008-117253 A | 5/2008 |
| JP | 2008-158768 A | 7/2008 |
| JP | 2008-257584 A | 10/2008 |
| JP | 2008-304963 A | 12/2008 |
| JP | 2009-070361 A | 4/2009 |

OTHER PUBLICATIONS

Webopedia, (Checksum), Aug. 6, 2002, pp. 1-2, http://web.archive/org/web/20020806183610/http://www.webopedia.com/TERM/C/checksum.html.*

PC Guide, "RAID Level 1", Feb. 11, 2001, pp. 1-2, http://web.archive.org/web/20010211020720/http://www.pcguide.com/ref/hdd/perf/raid/levels/singleLevel1-c.html.*

Japanese Office Action, Partial English-language Translation mailed Apr. 19, 2011 for corresponding Japanese Application No. 2009-187401.

"Japanese Office Action" mailed by JPO and corresponding to Japanese application No. 2009-187401 on Aug. 23, 2011, with English translation.

Japanese Office Action mailed Nov. 6, 2012 for corresponding Japanese Application No. 2009-187401, with Partial English-language Translation.

Japanese Office Action Mailed Mar. 5, 2013 for corresponding Japanese Appeal No. 2011-25200, with English-language Translation.

* cited by examiner

FIG. 4

| VOLUME | | CHECKSUM | | COMPARISON RESULT |
|---|---|---|---|---|
| SOURCE | DESTINATION | SOURCE | DESTINATION | |
| LUN 0 × 000 | VOLUME 0 × 010 | AAA | AAA | OK |
| LUN 0 × 001 | VOLUME 0 × 011 | BBB | BBB | OK |

FIG. 5

| PERFORMANCE CHARACTERISTIC GROUP | MIGRATION STATUS |
|---|---|
| 1 | 60 % |
| 2 | 50 % |

FIG. 6

| VOLUME | | PERFORMANCE CHARACTERISTIC GROUP | MIGRATION STATUS |
|---|---|---|---|
| SOURCE | DESTINATION | | |
| LUN 0 × 001 | VOLUME 0 × 001 | 1 | 60 % |
| LUN 0 × 002 | VOLUME 0 × 002 | 1 | 0 % |
| LUN 0 × 003 | VOLUME 0 × 004 | 2 | 50 % |
| LUN 0 × 004 | VOLUME 0 × 005 | 2 | 0 % |

DATA MIGRATION METHOD

CROSS-REFERENCE TO RELATED APPLICATION

This application is based upon and claims the benefit of priority of the prior Japanese Patent Application No. 2009-187401, filed on Aug. 12, 2009 the entire contents of which are incorporated herein by reference.

FIELD

The embodiment discussed herein is related to a data migration (copying) method and apparatus.

BACKGROUND

In recent years, as information becomes more digitized, information is increasingly stored as digitized data. Accordingly, storage devices tend to store ever more vast amounts of data for a long period of time. In those storage devices, data is commonly stored on a recording medium such as a hard disk, a DVD, or a magnetic tape.

Any storage device has a finite life span. In addition, there are cases where higher performance (in terms of access speed, storage capacity, or the like) is required of a storage device. Migration (copying) of data stored on a storage device to another storage device is performed for these reasons.

In this data migration, it is desirable to verify whether or not the migration of data to another storage device (destination) has been performed properly. The time required for the data migration is shorter the better.

As a data migration method according to the related art which verifies whether or not data migration has been performed properly, a method exists which copies data to a destination, then reads data from each of the storage device (source) from which the copied data is read and the destination, and compares both the data. This method makes it possible to reliably verify whether or not data has been copied properly. However, if there are vast amounts of data, it takes a long time to read data from each of the source and the destination and compare both the data. Thus, the time required for data migration tends to become very long.

In another data migration method according to the related art, a predetermined length of data is read from the source, and the area required for writing the read data to the destination is checked. In the other data migration method according to the related art mentioned above, by reading and writing data in predetermined data length units, whether or not the sizes of the read data and the written data match is verified during data migration. Therefore, data migration can be done in a shorter time. However, it is not possible to reliably verify whether or not data migration has been performed properly. This is because the same data size does not guarantee that the contents of both the data are the same.

In data migration, cases need to be considered where data at the source becomes inaccessible for reasons such as that the source storage device is discarded. With this taken into consideration, it can be said that it is important to allow data migration to be done in a shorter time while reliably verifying whether or not the data migration has been performed properly.

Japanese Laid-open Patent Publication No. 2005-242696, Japanese Laid-open Patent Publication No. 2008-117253, and Japanese Laid-open Patent Publication No. 2006-235698 are examples of related art.

SUMMARY

According to an aspect of the invention, a storage apparatus for controlling a storage unit includes a cache memory for temporarily storing data to be stored in the storage unit, and a processor for executing a process including receiving unit data which is divided from data to be migrated, calculating first checksum data from the received unit data, storing the unit data and the first checksum data to the cache memory, reading out the stored unit data and the first checksum data from the cache memory, calculating second checksum data from the read out unit data, storing the unit data to the storage unit, and determining whether data migration has been performed properly by comparing the first checksum data to the second checksum data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of display of the migration result;

FIG. 5 is a diagram illustrating an example of display of the progress status (Part 1);

FIG. 6 is a diagram illustrating an example of display of the progress status (Part 2);

DESCRIPTION OF EMBODIMENT

Hereinbelow, an embodiment of the present invention will be described with reference to the drawings.

Figure 1:
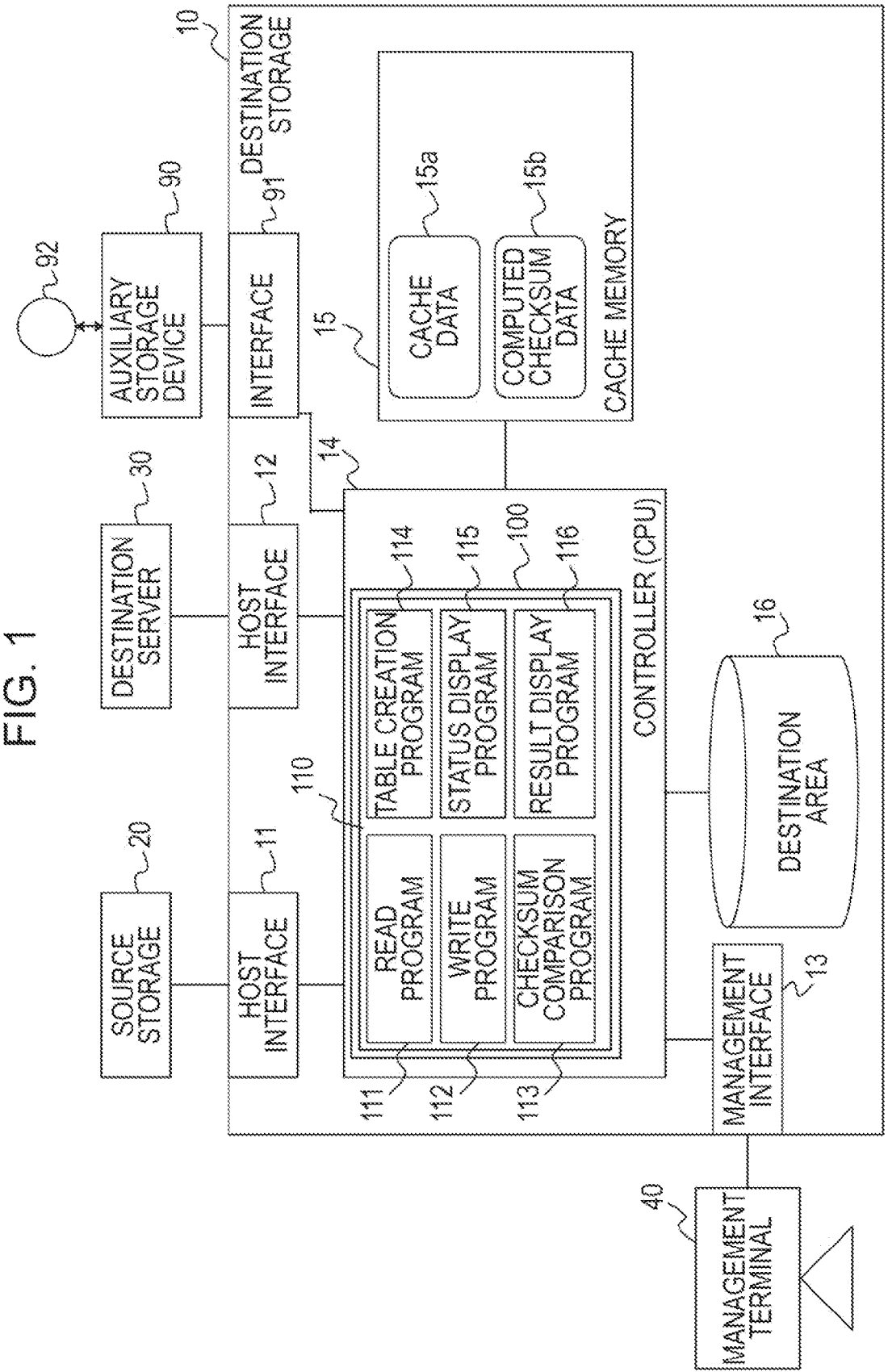
FIG. 1 is a hardware configuration diagram of a storage device that can implement a data migration method according to this embodiment.

FIG. 1 is a hardware configuration diagram of a storage device that can implement a data migration method according to this embodiment.

This storage device (indicated as "destination storage" in FIG. 1) 10 is installed with a read function for reading data from a connected external device. As shown in FIG. 1, the storage device 10 includes two host interfaces 11 and 12 for connection to external devices, a management interface 13 for connection to a management terminal device (indicated as "management terminal" in FIG. 1; this indication will hereinafter be used) 40 used for instruction of various operations or the like, a controller (CPU) 14 that controls the storage device 10 as a whole, a cache memory 15 used for storing various kinds of data, and recording media 16 used for storing data.

Although not particularly limited, the recording media 16 are, for example, hard disks, DVDs, or magnetic tapes. The recording media 16 may be written as a storage unit, a destination LUN, or a destination area.

If the recording media 16 are hard disks, the hard disks are installed in the storage device 10 as hard disk devices. If the recording media 16 are DVDs or magnetic tapes, such portable recording media are prepared in a way that allows their insertion/removal in/from a drive device, for example. For this reason, the storage device 10 is installed with a mechanism (e.g. robot) for inserting/removing recording media in/from the drive device, and a storage space for storing recording media that are not mounted in the drive device.

As described above, the configuration of the storage device 10 varies with the kind of the recording media 16. For this reason, to avoid confusion, hard disks are assumed here as an example of the recording media 16. That is, the storage device 10 is assumed to be a disk array device installed with a plurality of hard disk devices. On the basis of this assumption, reference numeral 16 is used to denote a group of hard disk devices installed in the storage device 10. Under this assumption, access to each hard disk from the controller 14 is done via a controller installed in a hard disk device including the hard disk.

FIG. 1 illustrates a system configuration in which the storage device 10 is connected with another storage device (indicated as "source storage" in FIG. 1) 20, a server 30 (indicated as "destination server" in FIG. 1), the management terminal 40 and an auxiliary storage device 90. This configuration represents a case in which data stored on the other storage device 20 is migrated to the storage device 10. That is, the above configuration represents a case in which data is migrated with the storage device 20 as a source and the storage device 10 as a destination. The server 30 executes processing using the data stored on the storage device 10 at the destination. To clarify such roles, in accordance with the indications in FIG. 1, the storage device 20, the storage device 10, and the server 30 will be referred to as "source storage", "destination storage", and "destination server", respectively.

The controller (computer) 14 of the destination storage 10 includes a non-volatile memory 100. A program (data migration program) 110 for implementing data migration which is executed by the controller 14 is stored in the memory 100. The program 110 includes, as sub-programs, a Read program 111 for reading data from an external device, a Write program 112 for writing data obtained by reading to each hard disk device of the group of hard disk devices 16, a checksum comparison program 113 for verifying whether or not data that has been read and data to be written match, a table creation program 114 for controlling the multiplicity in writing data, a status display program 115 for displaying the progress status of data migration, and a result display program 116 for displaying the result of data migration.

The controller 14 is connected to the auxiliary storage device via an interface 91. The auxiliary storage device 90 may read or write data stored in a computer readable storage medium 92. The computer readable storage medium 92 may store the program 110. The program 110 may be available as source code or in object code. The program 110 may be further comprised as part of, for example, a portable memory device or downloaded from the Internet, or embodied on a program of the storage unit or computer readable medium 92. The program 110 may also be available on a computer readable storage medium 92 which comprise all computer-readable media except for a transitory, propagating signal.

Data read by the Read program 111 from the source storage 20 is temporarily stored into a cache memory 15 as cache data 15*a*. In this embodiment, every time data is read from the source storage 20, the Read program 111 uses the data to compute a hash value as a checksum. This checksum is stored in the cache memory 15 as computed checksum data 15*b*.

Usually, the amount of data to be migrated is vast. The amount of data that can be read by the Read program 111 at once is typically very small in comparison to the amount of data to be migrated. For this reason as well, in this embodiment, data is read in several times in pre-set units. Accordingly, a checksum is also computed for each data that has been read from the source storage. Although not particularly limited, this pre-set unit is, for example, data of a predetermined length, or data of a storage area that can be logically divided. Data thus read on a unit-by-unit basis will hereinafter be referred to as "unit data".

A hash function is used to compute a checksum. This is because from data used for computation, a hash function yields a fixed-length value that varies with the contents of the data. In other words, a hash function is used because whether or not data that has been read and data to be written match can be verified with reliability even without performing a comparison between those pieces of data. Since a hash value is fixed-length data, whether or not those pieces of data match can be verified quickly at all times irrespective of the amount of data used for calculating the hash value. As for the method of computing a checksum, a computation method other than that using a hash function may be adopted as long as the checksum varies with the contents of data used for its computation.

Unit data read from the source storage 20 is temporarily stored into the cache memory 15 as the cache data 15*a*. The cache data 15*a* is written to the hard disk device on which to write data by the Write program 112. The Write program 112 computes a checksum (hash value) by using the cache data 15*a* read from the cache memory 15, and stores the checksum into the cache memory 15 as the computed checksum data 15*b*. Thus, for each piece of data read from the source storage by the Read program 111, the Write program 112 computes a separate checksum from the data to be actually written to a hard disk device. In this way, for each piece of data read by the Read program 111, it is possible to verify whether or not the read data and the data to be actually written match. Storage of data to the hard disk device by the Write program 112 is implemented by outputting the data to be stored, and a command for instructing data storage to the controller of the target hard disk device.

The checksum comparison program 113 is a program for verifying whether or not data migration has been performed properly after migration of all the data to be migrated is complete, by using one or more checksums computed by each of the Read program 111 and the Write program 112. This verification is performed by finding the cumulative values of checksums computed by the respective programs 111 and 112, and then verifying whether or not those cumulative values match. Since verification is performed by comparison of those cumulative values, the verification can be performed quickly even if data is read from the Read program 111 many times, in other words, even if the amount of data to be migrated is vast. If the cumulative values do not match, checksums may be compared individually to identify non-matching checksums, that is, unit data whose migration has not been performed properly. In the case when unit data is identified in this way, migration (copying) can be performed again with respect to only necessary unit data. Accordingly, comparison may be performed for each unit data without performing a comparison using cumulative values.

Figure 2:
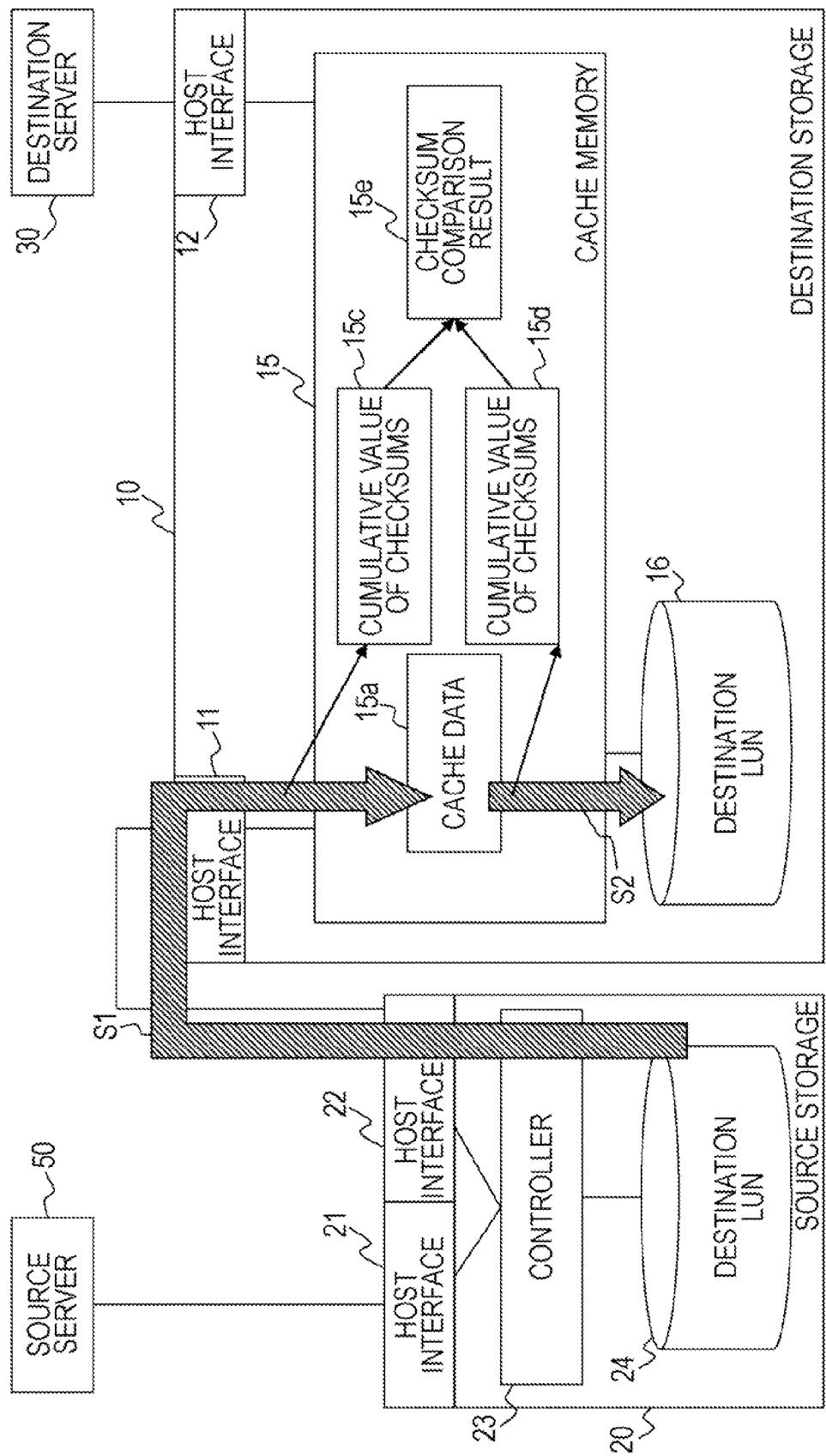
FIG. 2 is a diagram illustrating a data migration method according to this embodiment.

FIG. 2 is a diagram illustrating a data migration method according to this embodiment. Now, referring to FIG. 2, a data migration method implemented by each of the above-mentioned programs 111 to 113 will be specifically described. In FIG. 2, the source storage 20 includes two host interfaces 21 and 22, a controller 23, and recording media 24. The host interface 21 is connected with a server (source server) 50 that performs processing using data stored on the source storage 20, and the host interface 22 is connected with the destination storage 10. As in the destination storage 10, disk devices such as hard disk devices are assumed as the recording media 24.

The destination storage 10 performs data migration in accordance with an instruction from the management terminal 40. The operator of the management terminal 40 specifies the data (disk device) to be migrated from the source storage 20, and the hard disk device on the destination storage 10 to which the data is to be migrated, and executes data migration.

When it is instructed to execute data migration, the Read program 111 reads the data to be migrated in several times on a per unit data basis, computes a checksum from each read unit data, and stores the computed checksum and the unit data into the cache memory 15 (sequence S1). The Write program 112 reads the unit data stored as the cache data 15a from the cache memory 15, computes a checksum from the unit data, and stores the computed checksum into the cache memory 15 and stores the read unit data onto the hard disk device on which to store the data (sequence S2). In this way, until the last unit data is stored onto the hard disk device on which to store the data, reading of unit data from the source storage 20 and computation of a checksum by the Read program 111, and reading of unit data from the cache memory 15, storage of the read unit data onto a hard disk device, and computation of a checksum by the Write program 112 are repeated.

When storage of the last unit data onto a hard disk device is finished, the checksum comparison program 113 is executed. By executing the checksum comparison program 113, cumulative values 15c and 15d of checksums respectively computed by the Read program 111 and the Write program 112 are computed, and stored into the cache memory 15. The computed cumulative values 15c and 15d are compared with each other to determine whether they match or not, and the comparison result is stored into the cache memory 15 as checksum comparison result data 15e.

The computation of checksums, computation of cumulative values, and comparison of cumulative values can be performed in a short time in comparison to the time required for migrating unit data. Reading of unit data for computing a checksum is not performed. Therefore, data migration takes only roughly the same time it takes to migrate data by reading/writing data on a per unit data basis. For this reason, even if it is verified whether or not data migration has been performed properly, the time required for the verification can be minimized.

The hard disk devices constituting the group of hard disk devices 16 can be operated in parallel. In addition, the access speed of hard disk devices is normally lower when writing than when reading. For these reasons, in the related art, when migrating data to a plurality of hard disk devices on a destination storage, multiplexing is performed to store data in parallel onto the plurality of hard disk devices so that the data migration can be performed at high speed.

In the related art, multiplicity control for the multiplexing is performed in accordance with an operator's instruction. When instructing execution of data migration, the operator specifies the data (e.g. disk device) to be migrated from the source storage 20, and a hard disk device on the destination storage 10 to which the data is to be migrated. In this embodiment, on the basis of the specification, a multiplicity table indicating the order in which data is to be migrated is created for each hard disk device to which data is to be migrated, and data migration is performed for each hard disk device in accordance with the created table. Thus, it is possible to complete data migration in a shorter time while reducing the operator's burden.

The above-mentioned table creation program 114 is a program for creating this multiplicity table. Thus, reading of unit data by the above-mentioned Read program 111 (writing of unit data by the Write program 112) is normally performed in accordance with the multiplicity table created by the table creation program.

In a disk array device, a plurality of hard disk devices are usually managed as a single hard disk device. For this reason, hereinafter, a collection of a plurality of hard disk devices managed as a single hard disk device will be referred to as "performance characteristic group", and it is assumed that data migration is performed in units of such performance characteristic group.

In a drive device including a plurality of recording media, in order to enable access to each recording medium, a LUN (Logical Unit Number) as an address for identifying a recording medium is often assigned. Hereinafter, it is assumed that each target migration data on the source storage 20 is specified by LUN.

Figure 3:
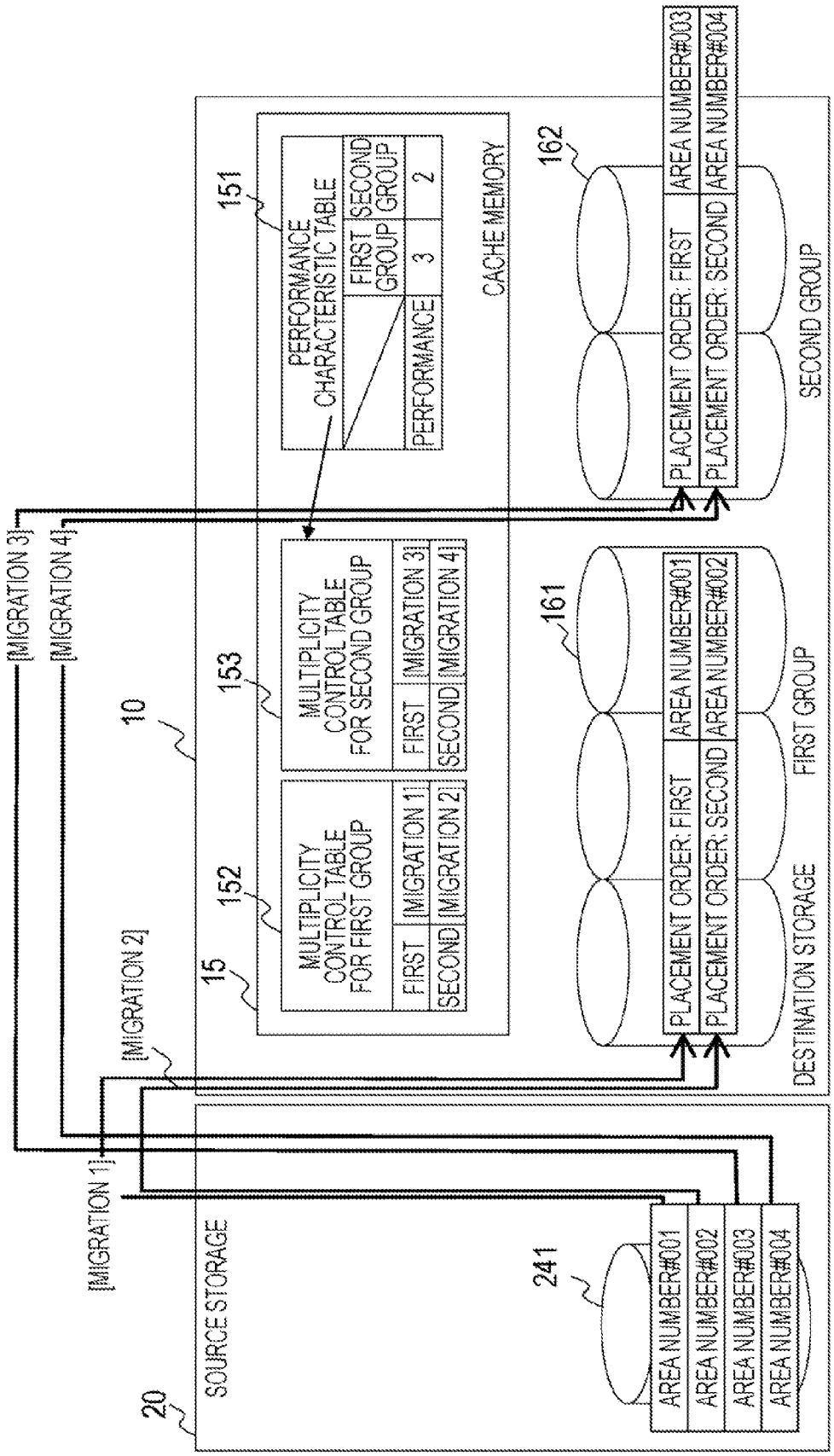
FIG. 3 is a diagram illustrating a method of creating a multiplicity control table, and data migration according to the created multiplicity control table.

FIG. 3 is a diagram illustrating a method of creating a multiplicity control table, and data migration according to the created multiplicity control table. In FIG. 3, each LUN is indicated as "area number". Information related to hard disk devices belonging to each performance characteristic group is stored in the cache memory 15 as a performance characteristic table 151.

In the performance characteristic table 151, performance information is stored for each performance characteristic group. The indications of "2" and "3" as performance information indicate that the numbers of hard disk devices belonging to the corresponding performance characteristic group are 2 and 3, respectively. More specifically, it is indicated that the number of hard disk devices belonging to a first group is 3, and the number of hard disk devices belonging to a second group is 2. Although not particularly shown, other pieces of information such as the number information indicating each belonging hard disk device, placement order information, and the like are also stored.

All of hard disk devices belonging to a performance characteristic group may not necessarily be used. A plurality of hard disk devices belonging to a group are used sequentially as required. The placement order information is information for determining the order in which hard disk devices are used in this way.

In this embodiments, storage of data onto hard disk devices is performed sequentially in order to prevent a decrease in access speed or occurrence of wasted area. Therefore, the unit data is sequentially stored into each of the hard disk devices. In this embodiments, data is also sequentially stored in the source storage 20. For this reason, the table creation program 114 creates a multiplicity control table in such a way that for each performance characteristic group subject to data migration, a LUN that is likely to store the more preceding data is migrated first. As a result, in the case when migrating data of LUNs with area numbers #001 to #004 on a drive device 241 on the source storage 20 to first and second groups 161 and 162, multiplicity control tables 152 and 153 as shown in FIG. 3 are created, respectively. The multiplicity table 152 for the first group 161 to which three hard disk devices belong indicates that pieces of data of LUNs with area numbers #001 and #002 are migrated in that order. The multiplicity table 153 for the second group 162 to which two hard disk devices belong indicates that pieces of data of LUNs with area numbers #003 and #004 are migrated in that order.

In the case of performing data migration on a per unit data basis, from the unit data being migrated, it is possible to determine the progress status, for example, the amount of data whose migration has been finished out of the amount of data to be migrated. The status display program 115 is a program for displaying the progress status determined in this way. The amount of data to be migrated is acquired from the source storage 20. The amount of data whose migration has been finished can be calculated by multiplying the amount of unit data by the number of times unit data is written to a hard disk device.

FIGS. 5 and 6 are diagrams each illustrating an example of display of the progress status. FIG. 5 shows a case in which the progress status is displayed for each performance characteristic group, and FIG. 6 shows a case in which the progress status is displayed for each hard disk device belonging to a performance characteristic group. In the case shown in FIG. 6, identification information (number information) indicating source LUNs and destination hard disk devices is further presented. In FIG. 6, "0x001", "0x002", and the like each indicate number information of a destination. As shown in FIGS. 5 and 6, this embodiment adopts, as the progress status, a migration status indicating the ratio of data whose migration has been actually finished out of the data to be migrated.

For the performance characteristic group whose identification number is 1 in FIG. 5, the migration status of the hard disk device whose number information is "0x001" is 60% and the migration status of the hard disk device whose number information is "0x002" is 0%. This indicates that for this performance characteristic group, it is specified by the placement order information that data be stored first onto the hard disk device "0x001" and then onto the hard disk device "0x002", and data is currently stored on only the hard disk device "0x001". Although not particularly shown, when storage of data onto the hard disk device "0x001" is finished, and storage of data onto the hard disk device "0x002" is started, the migration status of the hard disk device "0x001" is fixed to the numerical value at the time when the data storage is finished. After the fixing, the numerical value indicating the migration status of the hard disk device "0x002" is sequentially updated with the fixed numerical value as an initial value.

The status display program 115 is executed upon a request from the management terminal 40. The status display program 115 activated by the request creates a table (screen) summarizing the progress status as shown in FIG. 5 or 6, and transmits the table to the management terminal 40, for example. Thus, the operator can check the status of progress of data migration via the management terminal 40. Although detailed description will not be given, the manner of display of the progress status as shown in FIGS. 5 and 6 can be selected by the operator via the management terminal 40.

The result display program 116 is a program for displaying the result of data migration. Like the status display program 115, the result display program 116 is also executed upon a request from the management terminal 40.

The result display program 116 activated by the request creates a table summarizing the result as shown in FIG. 4, for example, and transmits the table to the management terminal 40, for example. Thus, the operator can check the result of data migration via the management terminal 40. In the display example shown in FIG. 4, for each source volume (LUN), a summary detailing the destination volume (hard disk device), the cumulative checksum value obtained from unit data that has been read, the cumulative checksum value obtained from unit data to be written, and the comparison result is given. The comparison result indicates matching of the two checksum values by "OK", and non-matching of the two checksum values by "NG". The result of data migration may be summarized for each performance characteristic group. For this reason, the display of the result of data migration is not limited to the one as shown in FIG. 4.

The activation of the result display program 116 may be performed automatically upon finishing data migration. Alternatively, at reception of a request from the management terminal 40, whether or not data migration is being performed may be determined so that the status display program 115 or the result display program 116 is activated in accordance with the result of the determination.

This embodiment is adapted to display the result of migration for each volume from which data to be migrated is read, or for each performance characteristic group that is a destination. Accordingly, the checksum comparison program 113 performs computation and comparison of cumulative checksum values for each volume from which data to be migrated is read, and for each performance characteristic group that is a destination. Thus, more information can be provided to the user on the side where data migration is performed.

Hereinbelow, with reference to the flowcharts of individual processes shown in FIGS. 7 to 10, a detailed description will be given of the operation of the destination storage 10 which is implemented by the controller 14 executing the data migration program 110 having the sub-programs 111 to 116 mentioned above. The data migration program 110 is activated upon a request from the management server 40, for example, and executes processing corresponding to the request from the management terminal 40 until its termination is instructed. Accordingly, the following description will be based on the assumption that the data migration program 110 is being executed.

Figure 7:
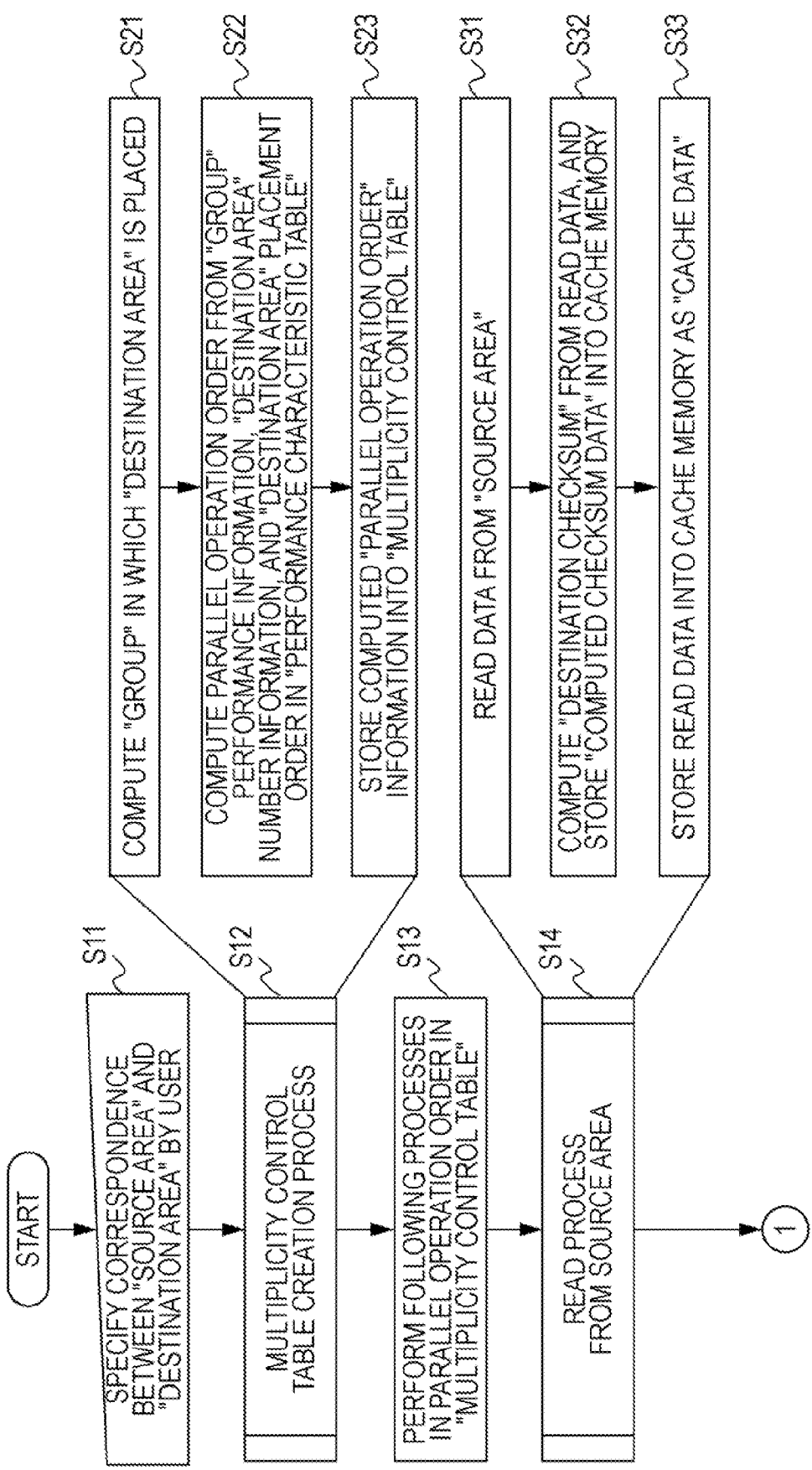
FIG. 7 is a flowchart of a data migration process.
Figure 8:
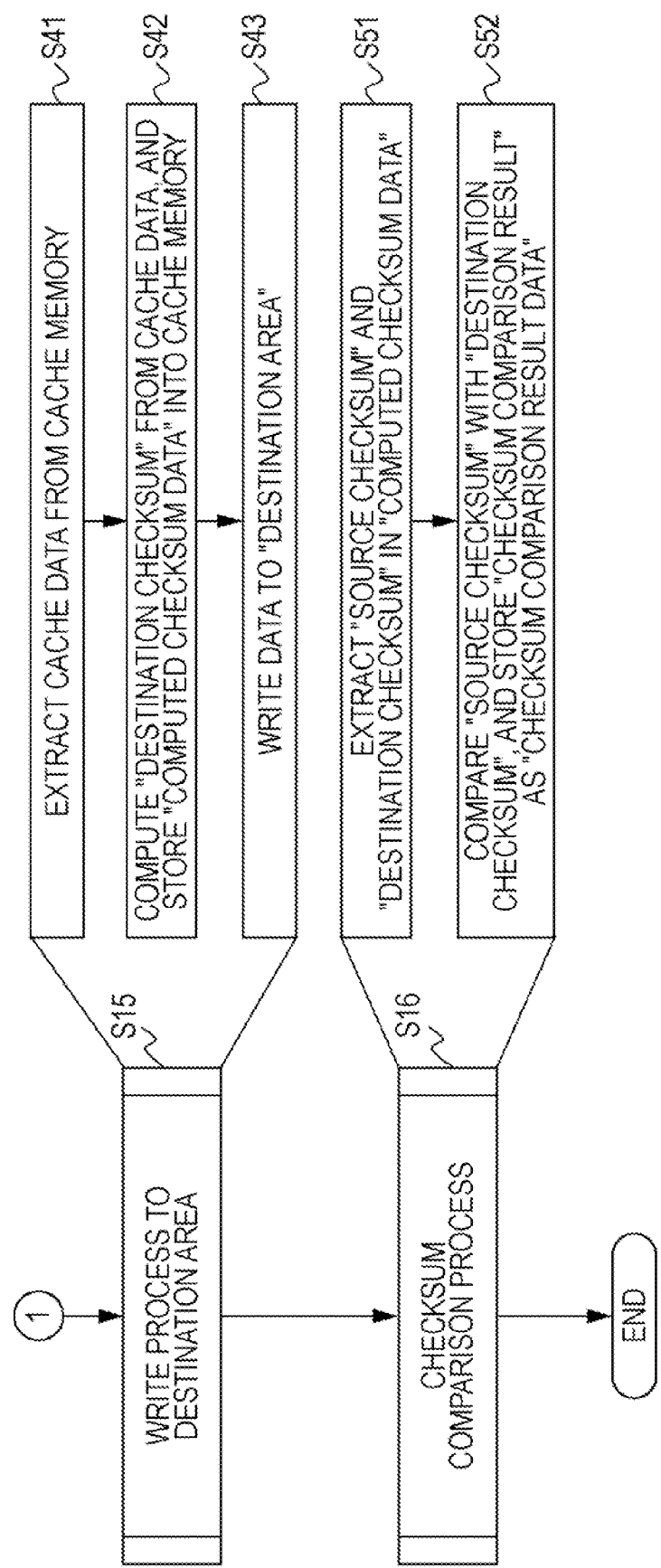
FIG. 8 is a flowchart of a data migration process (Continued)

FIGS. 7 and 8 are flowcharts showing a data migration process. This migration process represents the flow of processing executed when performing data migration. As described above, in this migration process, the Read program 111, the Write program 112, the checksum comparison program 113, and the table creation program 114 in the data migration program 110 are executed by the controller 14. First, referring to FIGS. 7 and 8, this migration process will be described in detail.

In data migration, it is necessary for the operator (user) of the management terminal 40 to specify the correspondence between a LUN on the source storage 20 on which data to be migrated is stored (indicated as "source area" in FIG. 7), and a hard disk device on the destination storage 10 onto which data of the LUN is to be stored (indicated as "destination area" in FIG. 7). The data migration program 110 first performs a process for handling the specification in step S11. Thus, the processing moves to step S12 when the correspondence is specified, and it is instructed by the operator to execute data migration in accordance with the specification.

In step S12, a multiplicity control table creation process for creating the multiplicity control table as shown in FIG. 3 is executed. This creation process is implemented by executing the table creation program 114. The processing moves to step S13 after the execution of the table creation program 114.

In this creation process, first, step S21 is executed to identify the performance characteristic group to which the specified hard disk device belongs. In step S22 that follows, the performance characteristic table 151 stored in the cache memory 15 is referenced, and for each identified performance characteristic group, the order in which to perform data migration is determined from its performance information, the number information of the specified hard disk device, and the placement order information. The determined order represents the parallel operation order for performing data migration in parallel for each performance characteristic group. In the next step S23, the determined parallel operation order is stored into the corresponding multiplicity control table. After creating a multiplicity control table for each performance characteristic group in this way, the multiplicity control table creation process is ended, and the processing moves to step S13.

In step S13, in accordance with the parallel operation order stored in the multiplicity control table, settings are made for data migration which is performed in several times on a per unit data basis, for each performance characteristic group. The read process from a source area in step S14, and the write process to a destination area in step S15 are repeatedly executed on a per unit data basis in accordance with the settings. The read process from a source area is implemented by executing the Read program 111, and the write process to a destination is implemented by executing the Write program 112.

In the read process from a source area, first, step S31 is executed, and unit data is read from the source area. The reading is implemented by requesting for transmission of the target unit data via the host interface 11, and the host interface 22 on the source storage 20.

In step S32, after waiting for acquisition of unit data from the source storage 20 by the request, a checksum (indicated as "source checksum" in FIG. 7) is computed from the acquired unit data, and the computed checksum is stored into the cache memory 15 as the computed checksum data 15b. In step S33 to which the processing moves next, the acquired unit data is stored into the cache memory 15 as the cache data 15a. After performing this storage, this read process from the source area is ended.

On the other hand, in the write process to a destination area, first, step S41 is executed, and the cache data 15a is extracted from the cache memory 15. In the next step S42, a checksum (indicated as "destination checksum" in FIG. 8) is computed from the extracted cache data 15a, and the computed checksum is stored into the cache memory 15 as the computed checksum data 15b. In step S43 to which the processing moves next, the extracted cache data (unit data) 15a is stored onto a hard disk device on which to store the data. After performing this storage, this write process to the destination is ended.

If there are still other unit data to be migrated, after executing the write process to the destination, the read process from the source in step S14 is executed again. Data migration is thus implemented on a per unit data basis. If there are no more other unit data to be migrated, after the write process to the destination is executed, the processing moves to step S16.

In step S16, a checksum comparison process is executed. This comparison process is implemented by executing the checksum comparison program 113. After executing this comparison process, the data migration process ends.

In this comparison process, first, step S51 is executed, and a destination checksum and a source checksum, which are stored in the cache memory 15 for each unit data as the computed checksum data 15b, are extracted. In step S52 that follows, the extracted source checksum and destination checksum are compared with each other, and the comparison result is stored into the cache memory 15 as the checksum comparison result data 15e. If there are a plurality of extracted source checksums and destination checksums, cumulative values are computed for each of the source checksums and the destination checksums, the computed cumulative values are compared with each other, and the comparison result is stored into the cache memory 15 as the checksum comparison result data 15e. Such computation and comparison of cumulative values are performed for each source volume and for each destination performance characteristic group, as required. After storing the checksum comparison result data 15e that varies with the circumstances into the cache memory in this way, the data migration process is ended.

Figure 9:
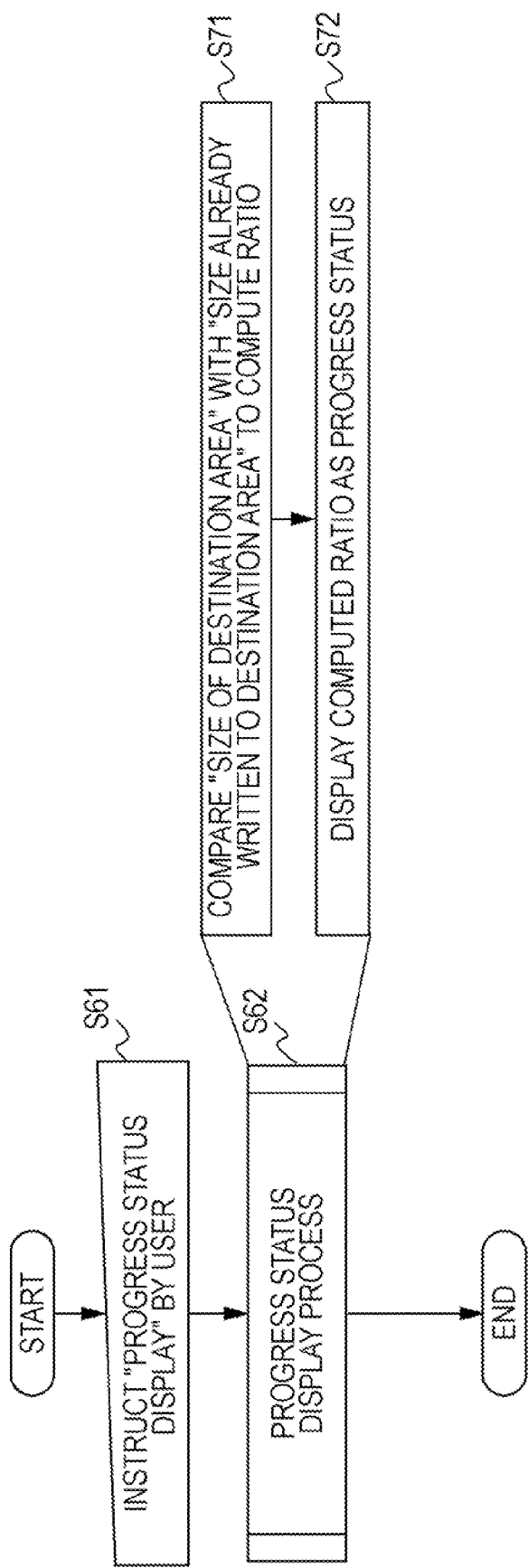
FIG. 9 is a flowchart of progress status processing.

FIG. 9 is a flowchart of progress status processing. Next, referring to FIG. 9, this status processing will be described in detail. This status processing represents the flow of processing executed when it is requested from the management terminal 40 to display the progress status, for example. The above-mentioned status display program 115 is executed in this status processing.

First, in step S61, a process for handling display of the progress status which is requested from the management terminal 40 is executed. Accordingly, the processing moves to step S62 on the condition that such a request is made from the management terminal 40, and a progress status display process for displaying the progress status of data migration is executed. This display process is implemented by the controller 14 executing the status display program 115.

In this display process, first, the process in step S71 is executed, in which the size of all the data to be migrated (indicated as "size of source area" in FIG. 9), and the size of already-migrated data (indicated as "size already written to destination area" in FIG. 9) are compared with each other, more specifically, the latter is divided by the former, thereby computing the ratio of data whose migration has been completed. In the next step S72, the computed ratio is displayed as the progress status. As mentioned above, the display is performed by, for example, creating a table (screen) as shown in FIG. 5 or 6 in which the computed ratio is placed, and transmitting the table to the management terminal 40. After displaying the progress status in this way, the progress status processing is ended.

Figure 10:
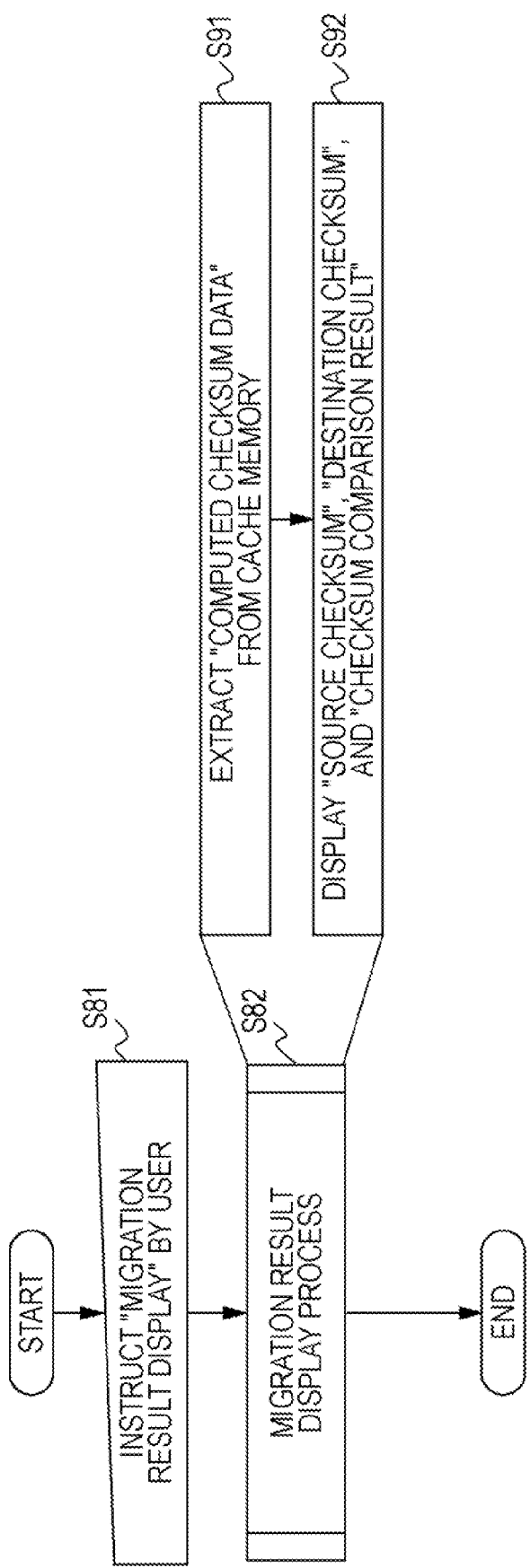
FIG. 10 is a flowchart of migration result processing.

FIG. 10 is a flowchart of migration result processing. Lastly, referring to FIG. 10, this result processing will be described in detail. This result processing represents the flow of processing executed when it is requested from the management terminal 40 to display the migration result, for example. The above-mentioned result display program 116 is executed in this result processing.

First, in step S81, a process for handling display of the migration result which is requested from the management terminal 40 is executed. Accordingly, the processing moves to step S82 on the condition that such a request is made from the management terminal 40, and a migration result display process for displaying the result of data migration is executed. This display process is implemented by the controller 14 executing the result display program 116.

In this display process, first, the process in step S91 is executed, in which source and destination checksums stored as the computed checksum data 15b, and the checksum comparison result stored as the checksum comparison result data 15e are extracted from the cache memory 15. In step S92 that follows, a table (screen) as shown in FIG. 4 in which the extracted source and destination checksums and checksum comparison result are placed is created, and the created table is transmitted to the management terminal 40. If a plurality of checksums exist, the cumulative value of the checksums is placed in the table for each volume. The same applies when summarizing the migration result for each performance characteristic table. After displaying the migration result on the management terminal 40 by transmitting such a table, the migration result processing is ended.

Figure 11:
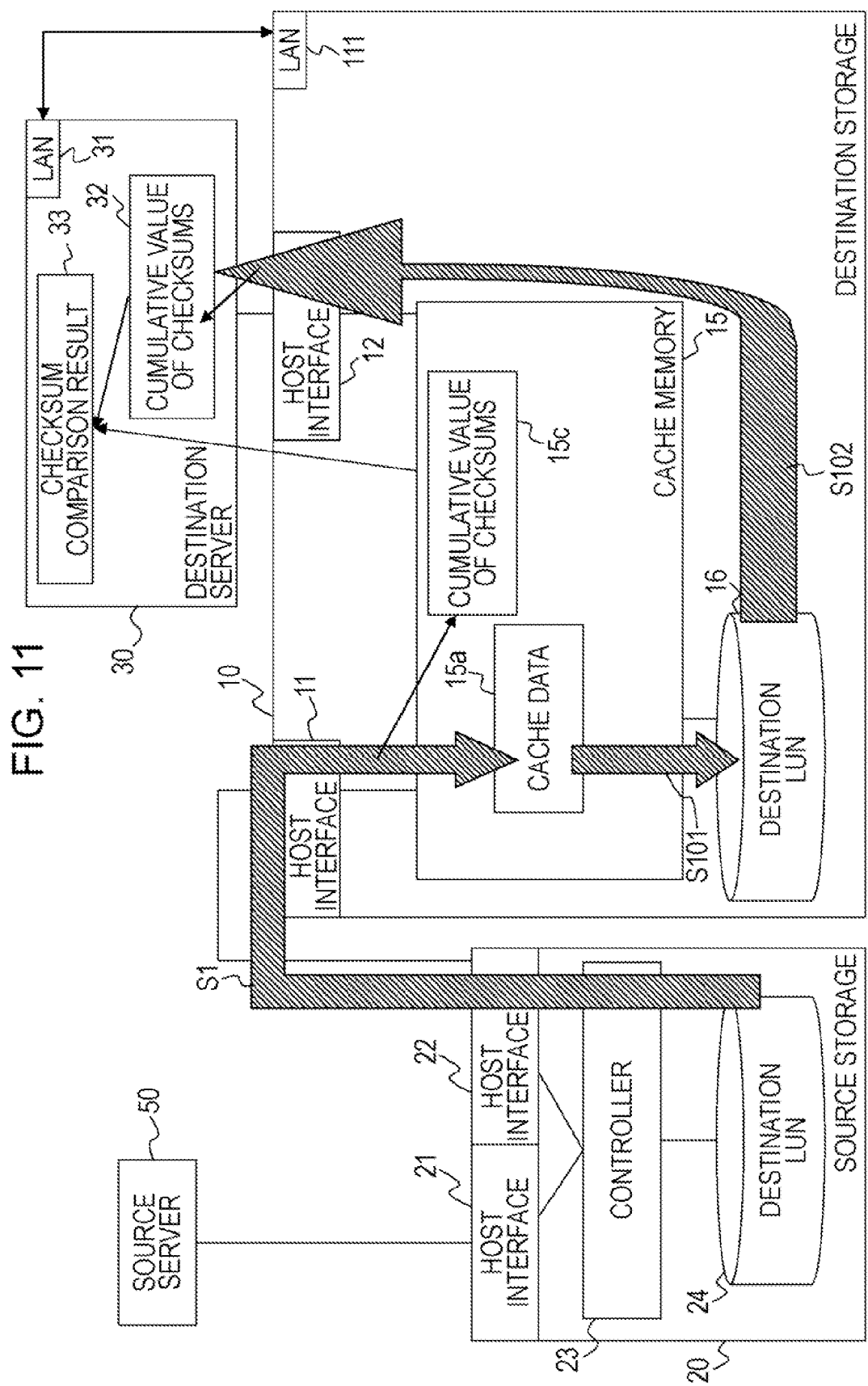
FIG. 11 is a diagram illustrating a modification of the data migration method according to this embodiment.

In this embodiment, computation of a destination checksum is performed using the cache data (unit data) 15a extracted from the cache memory 15. However, this computation may be performed by another method. For example, during data migration, a checksum may be computed by reading unit data written to a hard disk device. Alternatively, after data migration is finished, a destination checksum may be computed upon reading the migrated data to thereby check the migration result. As shown in FIG. 11, for example, such checking may be performed by an external device (computer) to which the destination storage 10 outputs data.

In the modification shown in FIG. 11, the destination storage 10 stores the cache data 15a extracted from the cache memory 15 onto a hard disk device (sequence S101), and the data stored onto the hard disk device is read and transferred upon a request from the destination server 30 (sequence S102). A checksum computed on a per unit data basis is transmitted to the destination server 30 before or after the transfer. To enable reading of data stored onto the hard disk device, information required for reading the data is transmitted from the destination storage 10 to the destination server 30. While the information may be transmitted by using the host interface 12, the information may be also transmitted by causing the information to be received by a LAN adapter 31 of the destination server 30 via a LAN adapter 111. Thus, by reading data migrated to the destination storage 10 and computing a destination checksum, the destination server 30 can verify whether or not data migration has been performed properly.

Adopting the above-mentioned method also eliminates the need to read data from the source storage 20. For this reason, whether or not data migration has been performed properly can be verified more quickly as compared with the case of reading data from the source storage 20 again. Accordingly, it suffices that the destination storage 10 be at least able to compute a source checksum. This means that the Write program 112 is not limited to this embodiment, and that the checksum comparison program 113 may not be executed by the controller (computer) 14 installed in the destination storage 10.

In this embodiment, whether or not data migration has been performed properly is verified after completion of the data migration. However, the verification may be performed upon every completion of migration of unit data. The verification may be performed for each source volume, or for each destination volume (for each hard disk device, performance characteristic group, or the like).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A system comprising:
a first memory configured to store data that has been divided into a plurality of unit data, and
a processor coupled to the memory to execute a process including:
receiving the plurality of unit data;
calculating, for each of the plurality of unit data, a first checksum;
calculating a first cumulative value, the first cumulative value being a sum of each first checksum;
first storing the plurality of unit data to the first memory;
first reading the plurality of unit data from the first memory;
calculating, for each of the plurality of unit data read by the first reading, a second checksum;
calculating a second cumulative value, the second cumulative value being a sum of each second checksum;
first comparing the first cumulative value to the second cumulative value to determine whether data migration has been properly performed; and
second comparing the first checksum to the second checksum corresponding to the first checksum when the first cumulative value and the second cumulative value do not match based on the first comparing.

2. The system according to claim 1, wherein the process executed by the processor further includes distributing migration data.

3. The system according to claim 2, wherein the process executed by the processor further includes determining an order for storing the plurality of unit data.

4. The system according to claim 1, wherein the process executed by the processor further includes outputting a progress status of the data migration.

5. The system according to claim 1, further comprising:
a management apparatus that is connected to a storage apparatus via an interface in the storage apparatus, wherein the process includes reading the plurality of unit data in a predetermined data length in accordance with an instruction for data migration by the management apparatus.

6. The system according to claim 1, further comprising determining whether the first checksum and the second checksum corresponding to the first checksum match based on the second comparing.

7. The system according to claim 6, further comprising:
second reading the plurality of unit data from a first storage apparatus prior to the receiving; and
second storing the plurality of unit data read by the first reading into a second storage apparatus.

8. The system according to claim 7, further comprising:
third reading a first unit data corresponding to the first checksum and the second checksum from the first storage apparatus when it is determined that the first checksum and the second checksum corresponding to the first checksum do not match by the determining; and
third storing the first unit data into the second storage apparatus.

9. A method of controlling a system, the method comprising:
receiving a plurality of unit data, the plurality of unit data being portions of data that has been divided into the plurality of unit data;
calculating, for each of the plurality of unit data, a first checksum;
calculating a first cumulative value, the first cumulative value being a sum of each first checksum;
first storing the plurality of unit data;
first reading the plurality of unit data stored by the first storing;
calculating, for each of the plurality of unit data read by the first reading, a second checksum;

calculating a second cumulative value, the second cumulative value being a sum of each second checksum;

first comparing the first cumulative value to the second cumulative value to determine whether data migration has been properly performed; and second comparing the first checksum to the second checksum corresponding to the first checksum when the first cumulative value and the second cumulative value do not match based on the first comparing.

10. The method according to claim 9, further comprising distributing migration data.

11. The method according to claim 10, further comprising determining an order for storing the plurality of unit data.

12. The method according to claim 9, further comprising outputting a progress status of the data migration.

13. The method according to claim 9, further comprising reading the plurality of unit data in a predetermined data length.

14. The method according to claim 9, further comprising determining whether the first checksum and the second checksum corresponding to the first checksum match based on the second comparing.

15. The method according to claim 14, further comprising:
second reading the plurality of unit data from a first storage apparatus prior to the receiving; and
second storing the plurality of unit data read by the first reading into a second storage apparatus.

16. The method according to claim 15, further comprising:
third reading a first unit data corresponding to the first checksum and the second checksum from the first storage apparatus when it is determined that the first checksum and the second checksum corresponding to the first checksum do not match by the determining; and
third storing the first unit data into the second storage apparatus.

17. A non transitory medium storing a program executed by a system including a storage apparatus including a first storage unit and a cache memory to temporarily store data to be stored in the first storage unit, the system executing a process by executing the program, the process comprising:
receiving a plurality of unit data, the plurality of unit data being portions of data that has been divided into the plurality of unit data;
calculating, for each of the plurality of unit data, a first checksum;
calculating a first cumulative value, the first cumulative value being a sum of each first checksum;
first storing the plurality of unit data into the cache memory;
first reading the plurality of unit data from the cache memory;
calculating, for each of the plurality of unit data read by the first reading, a second checksum;
calculating a second cumulative value, the second cumulative value being a sum of each second checksum;
first comparing the first cumulative value to the second cumulative value to determine whether data migration has been properly performed; and
second comparing the first checksum to the second checksum corresponding to the first checksum when the first cumulative value and the second cumulative value do not match based on the first comparing.

18. The non transitory medium according to claim 17, wherein the process further includes distributing migration data.

19. The non transitory medium according to claim 18, wherein the process further includes determining an order for storing the plurality of unit data.

20. The non transitory medium according to claim 17, wherein the process further includes outputting a progress status of the data migration.

21. The non transitory medium according to claim 17, further comprising determining whether the first checksum and the second checksum corresponding to the first checksum match based on the second comparing.

22. The non transitory medium according to claim 21, further comprising:
second reading the plurality of unit data from a second storage unit in an other storage apparatus prior to the receiving; and
second storing the plurality of unit data read by the first reading into the first storage unit.

23. The non transitory medium according to claim 22, further comprising:
third reading a first unit data corresponding to the first checksum and the second checksum from the second storage unit when it is determined that the first checksum and the second checksum corresponding to the first checksum do not match by the determining; and
third storing the first unit data into the first storage unit.

* * * * *